US009628426B2

(12) United States Patent
Bell, III et al.

(10) Patent No.: US 9,628,426 B2
(45) Date of Patent: Apr. 18, 2017

(54) INSTANT MESSAGING SYSTEM

(75) Inventors: John Francis Bell, III, Houston, TX (US); David Albert Meservy, Houston, TX (US)

(73) Assignee: Synacor, Inc., Newton, MA (US)

( * ) Notice: Subject to any disclaimer, the term of this patent is extended or adjusted under 35 U.S.C. 154(b) by 0 days.

(21) Appl. No.: 11/755,490

(22) Filed: May 30, 2007

(65) Prior Publication Data

US 2007/0226309 A1 Sep. 27, 2007

Related U.S. Application Data

(63) Continuation of application No. 10/330,786, filed on Dec. 27, 2002, now abandoned.

(60) Provisional application No. 60/344,197, filed on Dec. 28, 2001.

(51) Int. Cl.
*G06F 15/16* (2006.01)
*H04L 12/58* (2006.01)

(52) U.S. Cl.
CPC ............ *H04L 51/26* (2013.01); *H04L 12/587* (2013.01); *H04L 51/04* (2013.01); *H04L 51/24* (2013.01)

(58) Field of Classification Search
CPC ....... H04L 12/587; H04L 51/26; H04L 51/24; H04L 51/04

USPC ...... 709/206, 103, 207, 217; 455/3.01, 26.1; 705/8; 345/753
See application file for complete search history.

(56) References Cited

U.S. PATENT DOCUMENTS

| | | | |
|---|---|---|---|
| 6,301,609 B1 * | 10/2001 | Aravamudan et al. | 709/207 |
| 6,826,173 B1 * | 11/2004 | Kung et al. | 370/352 |
| 6,983,370 B2 * | 1/2006 | Eaton et al. | 713/182 |
| 2002/0101979 A1 * | 8/2002 | Borodow et al. | 379/265.02 |
| 2002/0130904 A1 * | 9/2002 | Becker et al. | 345/753 |
| 2002/0138588 A1 * | 9/2002 | Leeds | 709/217 |
| 2002/0161896 A1 * | 10/2002 | Wen et al. | 709/227 |
| 2002/0196741 A1 * | 12/2002 | Jaramillo et al. | 370/252 |
| 2003/0036393 A1 * | 2/2003 | Kanefsky | 455/466 |
| 2003/0055908 A1 * | 3/2003 | Brown et al. | 709/207 |
| 2003/0101343 A1 * | 5/2003 | Eaton et al. | 713/170 |
| 2003/0191676 A1 * | 10/2003 | Templeton | 705/8 |
| 2004/0073643 A1 * | 4/2004 | Hayes et al. | 709/223 |

* cited by examiner

*Primary Examiner* — Thuong Nguyen
(74) *Attorney, Agent, or Firm* — Blank Rome, LLP

(57) ABSTRACT

An instant messaging system is disclosed that provides a means for presenting information to a user about current conversants and for managing the handling of multiple messages from different parties. A priority hierarchy is established and set by a user with respect to each conversant. Messages from high priority conversants are delivered and displayed prior to messages from lower priority conversants. In a business setting, messages may be routed to particular individuals or with a particular priority based on characteristics or attributes of the message sender.

11 Claims, 2 Drawing Sheets

INSTANT MESSAGING SYSTEM

REFERENCE TO RELATED APPLICATIONS

This application is a continuation of application Ser. No. 10/330,786, filed Dec. 27, 2002, now abandoned, which claims priority from a Provisional Application Ser. No. 60/344,197, filed Dec. 28, 2001, which are hereby incorporated by reference.

BACKGROUND OF THE INVENTION

The present invention relates to internet-based communications systems and, more particularly, to an instant messaging system that provides the user with information and control over handling of message for multiple conversations.

Instant messaging has become a powerful and popular communication tool that is used by individuals and businesses alike as an effective means to transfer and relay information to other individuals and/or to customers. Instant messaging permits group or two-party conversations to occur in a reasonable approximation of real time. Instant messaging system currently available are not dependent upon the use of any particular hardware, such that parties can communicate through instant messaging without regard for the particular types of devices or computer hardware that each party is using.

Instant messaging systems permit parties to engage in multiple conversations contemporaneously. It is not unusual for one person to be engaged in five or more separate conversations with different individuals at the same time. Maintaining control over multiple conversations is difficult, however, as it is easy to forget details about a particular conversant or about the history of the conversation to the current point in time. Often, too, one or more conversations may become more important than others, but with current instant messaging systems, messages arrive at a user's desktop in the order in which they are delivered, such that several or many messages from "less important" conversants may arrive before a message from the desired conversant. Keeping track of the message thread with particular individuals may be difficult and may cause messages to be missed or ignored inadvertently.

SUMMARY OF THE INVENTION

It is therefore an object of the present invention to provide an instant messaging system that presents to the sender of a message information about the recipient at the time a message is sent.

It is a further object of the present invention to provide an instant messaging system that permits users to establish priority levels of active conversants. Messages from conversants having a higher set priority than other conversant will be delivered and displayed to the user before messages are delivered from lower priority conversants.

It is yet a further object of the present invention to provide an instant messaging system that permits routing of messages and setting of priority of senders based on sender attributes.

It is still a further object of the present invention to provide an instant messaging system that permits storage of conversant data to occur locally, centrally or in a distributed storage system.

These and other objects will become apparent from the illustrated drawing and the description of the embodiments.

DESCRIPTION OF THE EMBODIMENTS

Figure 1:
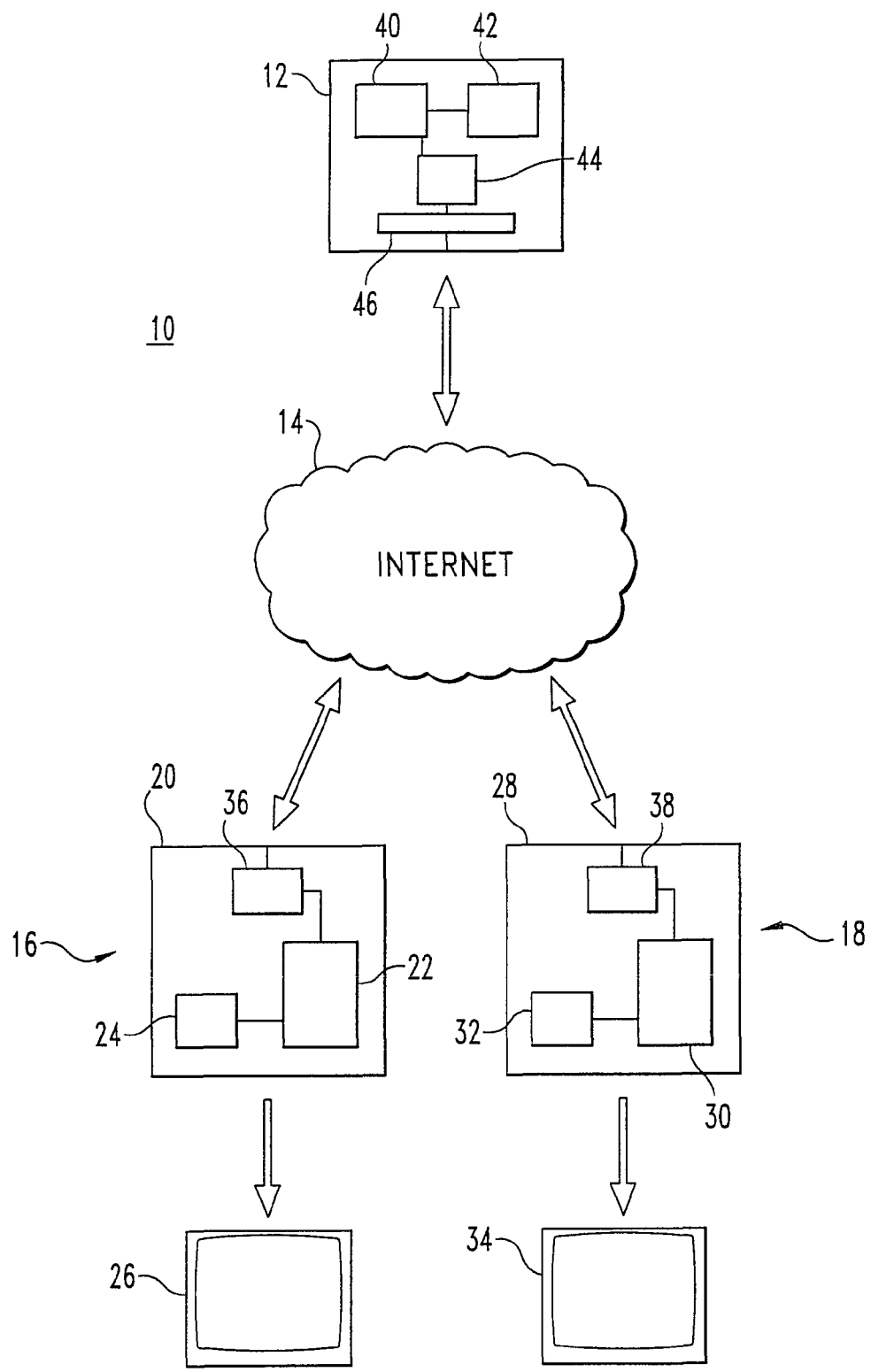
FIG. 1 is a block diagram of an instant messaging system in accordance the present invention.

Referring to FIG. 1, there is shown an instant messaging system 10 that includes a server 12, which may be formed as part of network server that performs a number of tasks in addition to managing instant messages. The instant messaging capability of server 12 allows two or more individual users to send instant messages to one another in approximation of real time. Server 12 is shown illustratively as utilizing the internet, identified as element 14 in FIG. 1, as its communications link. FIG. 1 illustratively shows individual users 16 and 18, although it is understood that many users can be associated with instant messaging system 10 at any given time. Individual user 16 is shown as comprising a computer 20 incorporating a processor 22 and memory 24, which may comprise one or more types of computer memory, such as hard disc memory, RAM, or solid state memory. User 16 also comprises a display 26. Individual user 18 is shown a comprising a computer 28 having a processor 30 and memory 32, such as that used in computer 20, and a display 34. User 16 communicates via the internet by way of communications means 36, which may be any type of communications device, such as a cable modem or telephonic modem, for example. Likewise, user 18 communicates through the internet using a communications means 38, which may also be a variety of different communications devices. The operating systems of computers 20 and 28 are not required to be the same, as the instant messaging system operates without regard to the type of hardware or software used by the individual users.

FIG. 1 illustrates server 12 as managing the instant messaging system of the present invention, but peer to peer instant messaging systems are also available and the present invention is equally adaptable to peer to peer systems and server-based instant messaging systems. Server 12 includes a processor 40, memory 42, and a communications device 44 operating through a firewall 46. Server 12 may also include other components and elements unrelated to the management of an instant messaging system.

In operation, user 16 communicates with server 12 in order to "log on" to the instant messaging system. Server 12 may recognize user 16 as a previously authorized user, or user 16 may initiate a new account for purposes of utilizing the instant messaging functionality of system 10. For illustration purposes, user 18 was previously utilizing the instant messaging system at the time user 16 logged on. Server 12 may provide information to each of the users logged onto the instant messaging system related to the number and identity of users authorized to use the system, as well as the identity of users who are currently logged on.

The operation of instant messaging system 10 may be illustrated as follows. Upon logging onto the instant messaging system, user 16 is alerted that user 18 is also currently logged on. User 16 therefore decides to compose and send an instant message to user 18. In accordance with an aspect of the present invention, when user 16 initiates an outgoing message to user 18, information about user 18 appears on display 26 of user 16. This information, which may comprise, for example, the name, address, phone number, email address, notes, conversation logs, business transaction information, or any other type of information about user 18 that may be useful to or desired by user 16. This information could be stored in memory 24 of computer 20 of individual user 16, or it may be centrally stored in memory 42 of server 12 and transmitted to user 16 when server 12 recognizes that user 16 has sent a message to user 18, or it may be stored in some other location. In a similar manner, when user 18 sends a message to user 16, information concerning user 16 appears on display 34 of user 18. The type of information that is presented to user 18 about user 16 may be the same as that presented to user 16 about user 18, or it may be different. The information, as described above, is uniquely determined by each individual user in accordance with their choices and desires and is typically kept confidential by the user who creates or designates it, but may be shared with other users if desired. The present invention, therefore, allows a user of an instant messaging system to have ready access to information related to each of the other users with which that user is communicating. It is not unusual for a user to be in communication with ten or more other users at the same time, and the present invention helps each user keep track of pertinent information about other users in order to aid the user in efficiently managing a number of simultaneous instant message conversations.

Figure 2:
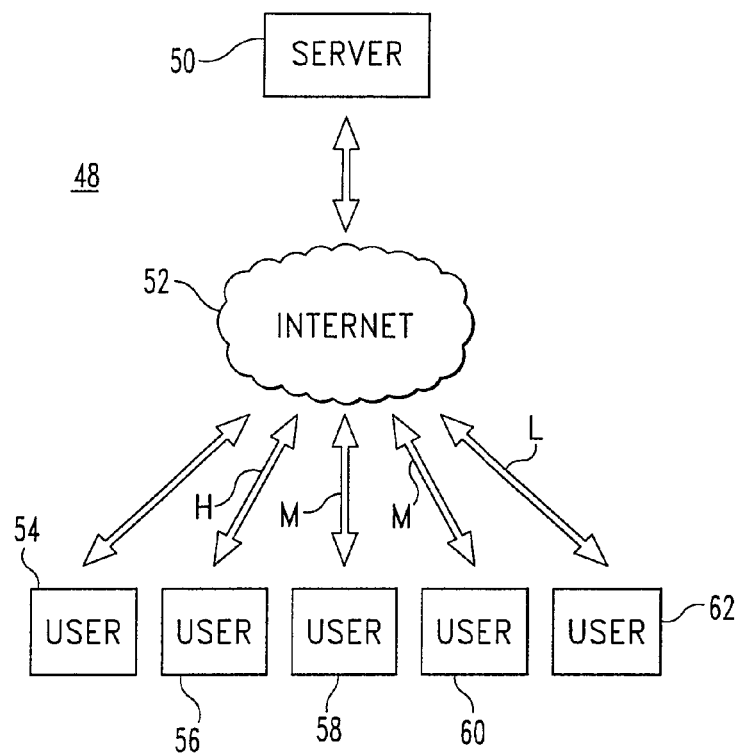
FIG. 2 is a block diagram of an instant messaging system in accordance with another aspect of the present invention.

Referring to FIG. 2, there is shown an instant messaging system 48 in accordance with another aspect of the present invention. Messaging system 48 is shown in simplified form, but it is understood that the components of system 48, such as the computers utilized by individual users, contain all necessary elements required to fully employ the functionality of messaging system 48.

In the example of FIG. 2, messaging system 48 comprises a central server 50, which communicates via the internet (shown as element 52). Individual users 54, 56, 58, 60, and 62 are illustratively shown as being associated with messaging system 48, although it is understood that messaging system 48 may serve large numbers of users. Users 54, 56, 58, 60, and 62 may be part of a designated list of associated users, often known as a buddy list, or may be participating in a group conversation, such as a chat room.

For illustrative purposes, each of users 54, 56, 58, 60, and 62 is carrying on instant message conversations with each of the other users in that group. In accordance with an aspect of the present invention, a conversation manager or queuing system allows each user to designate a priority level to each of the other users in their instant messaging group. An individual user could also be engaged in conversations with users in other groups or buddy lists at the same time. During a conversation session, a message queue status display available to each user will show the active conversations ongoing or pending. When a user selects a particular conversation, a conversation log or history is displayed, along with information about the other user or conversant. This allows a user to easily recall the conversation history with that individual which makes it easier to pick up and continue the conversation, particularly when several or many conversations are ongoing at one time with a given user. Once a message is sent, the user may choose to stay in that conversation, or may switch to a different conversation. The priority level designated or assigned to other users will determine how the conversations are selected or switched by the user designating the priority levels. For example, user 54 may assign a high priority to user 56 (shown as H in FIG. 2), a medium priority to users 58 and 60 (shown as M in FIG. 2), and a low priority to user 62 (shown as L in FIG. 2). Users 56, 58, 60, and 62 may assign the same, or different priority levels to user 54 compared to the priority level user 54 assigns to them. In this example, three priority levels have been described, but it is understood that messaging system 48 may be designed and operate with any number of priority levels. The priority level assigned to each user will determine which conversations are active with respect to user 54 at any given time. As messages from user 56, for example, are routed through server 50 to user 54, the high priority level assigned to user 56 by user 54 will cause the conversation between user 54 and user 56 to become active on the display of user 54. As long as messages continue to arrive from user 56, the particular conversation will remain active and other conversations will stay inactive and messages from other users will not appear to user 54 but will stay in a message queue. During lulls in the conversation between user 54 and user 56, conversations and associated messages from users having medium priority designations will become active and be displayed. If a message from user 56 arrives, the conversation will switch based on the higher priority assigned to user 56. Message of equal priority will be delivered or serviced on a first in-first out (FIFO) basis.

It is possible that low priority conversations and their associated messages may remain in the message queue and never be serviced if there are a number of higher priority conversation are those conversations are very active. The messaging system 48 of the present invention allows a user to set a message queue delay limit or queue expiration time. This causes a low priority message that exceeds a delay time without being serviced or delivered to be elevated in priority within the message queue. Setting of a delay limit is not required, however, and it is possible that some conversations will never become active as long as other higher priority conversations continue.

Figure 3:
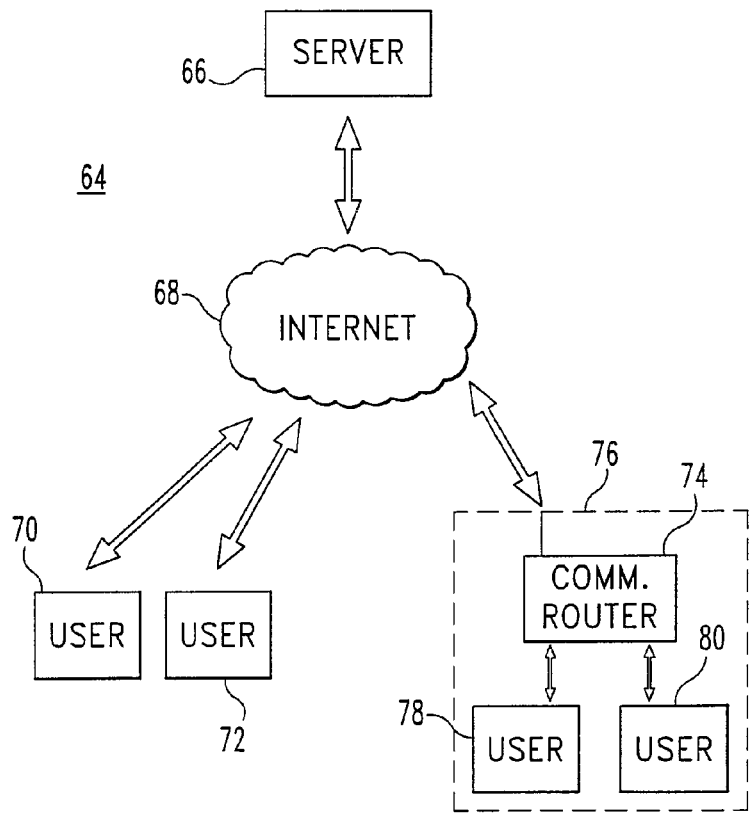
FIG. 3 is a block diagram of an instant messaging system in accordance with yet another aspect of the present invention.

FIG. 3 illustrates an instant messaging system 64 of the present invention that may be utilized by organizations or entities rather than individual users. Such an organization may provide technical assistance or some other form of service, for example. FIG. 3 shows a server 66, communicating through the internet (designated as element 68) to individual users 70 and 72. Also shown as part of messaging system 64 is a communications router 74, which is used by an organization 76 and is illustratively shown as being linked to users within organization 76.

An illustrative example of the operation of messaging system 64 is as follows. For this example, organization or entity 76 is illustratively described as a technical service department within a larger organization. When individual user 70 initiates a conversation with entity or organization 76 by sending a message to entity 76, communications router 74 receives the message and delivers it to a service technician, shown in FIG. 3 as users 78 and 80. In accordance with an aspect of the present invention, conversations may also be transferred from one technician to another to balance conversation loads. The conversation history and information about the conversant or conversants will also be transferred as well, enabling the technician who receives the transferred conversation to easily come up to speed concerning what has already transpired in the conversation. In accordance with another aspect of the present invention, individual users, such as users 70 and 72, may be assigned different priorities by communications router 74. For example, if user 72 has paid for a higher level of technical assistance than user 70, messages from user 72 will take a higher place in the message queue of entity 76 than will messages from user 70, such that messages from user 72 are processed faster than are messages from user 70. Communications router 74 may also rout message to particular technicians based on user priority settings, or based on information about the users who are sending messages. Again for example, technician 78 may have particular expertise in an area to which the problem or concern of a user pertains. Communications router may then rout messages from users who require the expertise of technician 78 to technician 78. As another example, technician 80 may be designated as the technician who services users who have paid for technical assistance, such that those users receive quick and efficient help when they contact entity 76.

The data for the previously described messaging systems, such as priority settings, user information, and conversation logs may be stored locally with individual users, on a central server, or in a distributed data storage system. Any available data storage technology may be used. If the information is not stored locally, a user may use any computer to log into the messaging system and still have previously created user information and priority settings available without having to recreate the information.

While the present invention has been illustrated in the drawing and described in detail in the foregoing description, it is understood that such illustration and description are illustrative in nature and are not to be considered restrictive, it being understood that only the preferred embodiments have been shown and described and that all changes and modifications that would be apparent or would occur to one skilled in the art are to be protected.

What is claimed is:

1. An instant messaging system comprising:
   means for receiving at least one message from each of a plurality of senders;
   means for determining at least one attribute associated with each of said plurality of senders;
   means for assigning a priority level to said at least one received message from each of said plurality of senders based on said attribute;
   means for displaying messages received by a recipient; and
   means for controlling as active or inactive the states of the display of said messages received by said recipient in response to said priority level,
   wherein said at least one message comprises a service request and wherein said recipient comprises a plurality of service representatives.

2. The instant messaging system of claim 1, wherein said priority level may be increased with respect to one or more senders in order to improve the message response time with respect to said one or more senders.

3. An instant messaging system comprising:
   a first user receiving messages from a plurality of second users;
   prioritization means associated with said first user for assigning a priority level of a plurality of priority levels to each of said second users;
   means for displaying messages received by said first user; and
   means for determining as active or inactive the states of the display by said first user of said messages received from each of said second users in accordance with said priority levels,
   wherein said priority level of at least one of said second users may be increased in response to a message received from said at least one of said second users that has not been set to an active state for at least a predetermined period of time.

4. An instant messaging system comprising:
   a first user receiving messages from a plurality of second users;
   prioritization means associated with said first user for assigning a priority level of a plurality of priority levels to each of said second users;
   means for displaying messages received by said first user; and
   means for determining as active or inactive the states of the display by said first user of said messages received from each of said second users in accordance with said priority levels,
   wherein messages from said second users having low priorities are set to an active state during periods of time when no messages are being received from said second users having high priorities.

5. A method for operating an instant messaging system comprising the steps of:
   receiving by a computer of a first user messages from a plurality of second users;
   prioritizing, by the computer, said messages received by said first user by assigning a priority level of a plurality of priority levels to each of said second users;
   displaying, by the computer, messages received by said first user; and
   determining, by the computer, as active or inactive the states of the display by said first users of said messages received from each of said second users in accordance with said priority levels,
   wherein said priority level of at least one of said second users may be increased in response to a message received from said at least one of said second users that has not been set to an active state for at least a predetermined period of time.

6. A method for operating an instant messaging system comprising the steps of:
   receiving by a computer of a first user messages from a plurality of second users;
   prioritizing, by the computer, said messages received by said first user by assigning a priority level of a plurality of priority levels to each of said second users;
   displaying, by the computer, messages received by said first user; and
   determining, by the computer, as active or inactive the states of the display by said first users of said messages received from each of said second users in accordance with said priority levels,
   wherein messages from said second users having low priorities are set to an active state during periods of time when no messages are being received from said second users having high priorities.

7. A method for operating an instant messaging system comprising the steps of:
   receiving at least one message from each of a plurality of senders;
   determining at least one attribute associated with each of said plurality of senders;
   assigning a priority level to said at least one received message from each of said plurality of senders based on said attribute;
   displaying messages received by a recipient; and
   controlling as active or inactive the states of the display of said messages received by said recipient in response to said priority level,
   wherein said at least one message comprises a service request and wherein said recipient comprises a plurality of service representatives.

8. The method of claim 7, wherein said priority level may be increased with respect to one or more senders in order to improve the message response time with respect to said one or more senders.

9. An instant messaging system comprising:
- a communication device associated with a first party for sending a message to a second party;
- a storage device responsive to the identification of said second party for accessing information related to previous messages between said first party and said second party;
- a display associated with said first party for displaying said information concerning said previous messages between said first party and said second party; and
- a prioritizer associated with said second party for determining the active or inactive states of the display of messages from said first party with respect to messages from at least one other party;
- wherein said priority level of at least one of said second parties may be increased in response to a message received from said at least one of said second parties that has not been set to an active state for at least a predetermined period of time.

10. An instant messaging system comprising:
- a communication device associated with a first party for sending a message to a second party;
- a storage device responsive to the identification of said second party for accessing information related to previous messages between said first party and said second party;
- a display associated with said first party for displaying said information concerning said previous messages between said first party and said second party; and
- a prioritizer associated with said second party for determining the active or inactive states of the display of messages from said first party with respect to messages from at least one other party;
- wherein messages from said second parties having low priorities are set to an active state during periods of time when no messages are being received from said second parties having high priorities.

11. An instant messaging system comprising:
- a communication device associated with a first party for sending a message to a second party;
- a storage device responsive to the identification of said second party for accessing information related to previous messages between said first party and said second party;
- a display associated with said first party for displaying said information concerning said previous messages between said first party and said second party; and
- a prioritizer associated with said second party for determining the active or inactive states of the display of messages from said first party with respect to messages from at least one other party;
- wherein said priority level may be increased with respect to one or more second parties in order to improve the message response time with respect to said one or more second parties.

* * * * *

UNITED STATES PATENT AND TRADEMARK OFFICE
CERTIFICATE OF CORRECTION

PATENT NO.        : 9,628,426 B2                                      Page 1 of 1
APPLICATION NO.   : 11/755490
DATED             : April 18, 2017
INVENTOR(S)       : Bell, III et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1213 days.

Signed and Sealed this
Twenty-fifth Day of September, 2018

Andrei Iancu
*Director of the United States Patent and Trademark Office*